US012591526B2

(12) United States Patent　　(10) Patent No.:　US 12,591,526 B2
Kuttan　　　　　　　　　　　　(45) Date of Patent:　　Mar. 31, 2026

(54) ALLOWING NON-VOLATILE MEMORY EXPRESS (NVMe) OVER FABRIC (NVMe-oF) TRAFFIC OVER INTERFACES USING A SCALABLE END POINT (SEP) ADDRESSING MECHANISM

(71) Applicant: HEWLETT PACKARD ENTERPRISE DEVELOPMENT LP, Spring, TX (US)

(72) Inventor: Harish Kuttan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 143 days.

(21) Appl. No.: 18/498,536

(22) Filed: Oct. 31, 2023

(65) Prior Publication Data

US 2025/0139023 A1　　May 1, 2025

(51) Int. Cl.
　G06F 13/16　　　(2006.01)
　G06F 12/02　　　(2006.01)
(52) U.S. Cl.
　CPC ...... G06F 13/1668 (2013.01); G06F 12/0238 (2013.01); G06F 2212/251 (2013.01)
(58) Field of Classification Search
　CPC ............. G06F 13/1668; G06F 12/0238; G06F 2212/251
　USPC ........................................................ 710/308
　See application file for complete search history.

(56) References Cited

U.S. PATENT DOCUMENTS

| | | | |
|---|---|---|---|
| 9,298,648 B2 | 3/2016 | Johnson et al. | |
| 9,483,431 B2 | 11/2016 | Bergsten et al. | |
| 9,852,107 B2 | 12/2017 | Underwood et al. | |

| | | | |
|---|---|---|---|
| 9,934,177 B2 * | 4/2018 | Goren | ................. H04L 67/1097 |
| 10,591,470 B2 * | 3/2020 | Iwamoto | ............ B01D 15/3809 |
| 10,769,098 B2 | 9/2020 | Joshua et al. | |
| 10,776,012 B2 | 9/2020 | Enz et al. | |
| 10,860,511 B1 | 12/2020 | Thompson et al. | |
| 10,880,204 B1 * | 12/2020 | Shalev | ................. H04L 47/365 |
| 10,892,990 B1 * | 1/2021 | Dighe | .................. H04L 5/0055 |

(Continued)

FOREIGN PATENT DOCUMENTS

WO　　2016/182756 A1　11/2016

OTHER PUBLICATIONS

Grun et al., "A Brief Introduction to the OpenFabrics Interfaces A New Network API for Maximizing High Performance Application Efficiency", IEEE 23rd Annual Symposium on High-Performance Interconnects, 2015, 6 pages.

(Continued)

*Primary Examiner* — Christopher B Shin
(74) *Attorney, Agent, or Firm* — Dickinson Wright

(57)　　　　　ABSTRACT

In a computer network, communication connections may be established between host devices of a domain object and compute devices of the computer network to allow data transfers. To establish a connection between the domain object and the network, a set of CPU core connections in the network may be determined. A set of transmit and receive contexts for the domain object may be generated, with each set of transmit and receive contexts being aligned with one of the set of CPU core connections. A scalable end point (SEP) for the domain object may be generated. The SEP may be used to map the set of transmit and receive contexts to the set of CPU core connections and the domain object, which can be used to transfer data throughout the network.

20 Claims, 8 Drawing Sheets

(56) References Cited

U.S. PATENT DOCUMENTS

| | | | |
|---|---|---|---|
| 2019/0042151 A1* | 2/2019 | Yang | G06F 3/0683 |
| 2019/0390876 A1* | 12/2019 | Matsuda | F25B 13/00 |
| 2020/0319812 A1 | 10/2020 | He et al. | |
| 2021/0019270 A1 | 1/2021 | Li et al. | |
| 2022/0334989 A1* | 10/2022 | Bar-Ilan | G06F 9/45558 |
| 2025/0047588 A1* | 2/2025 | West | H04L 47/808 |
| 2025/0077446 A1* | 3/2025 | Kachare | G06F 13/1668 |

OTHER PUBLICATIONS

Nvidia, "Unified Communication—X Framework Library", available online at <https://web.archive.org/web/20221012102509/https://docs.nvidia.com/networking/display/hpcxv24/Unified+Communication+-+X+Framework+Library>, Oct. 12, 2022, 9 pages.

* cited by examiner

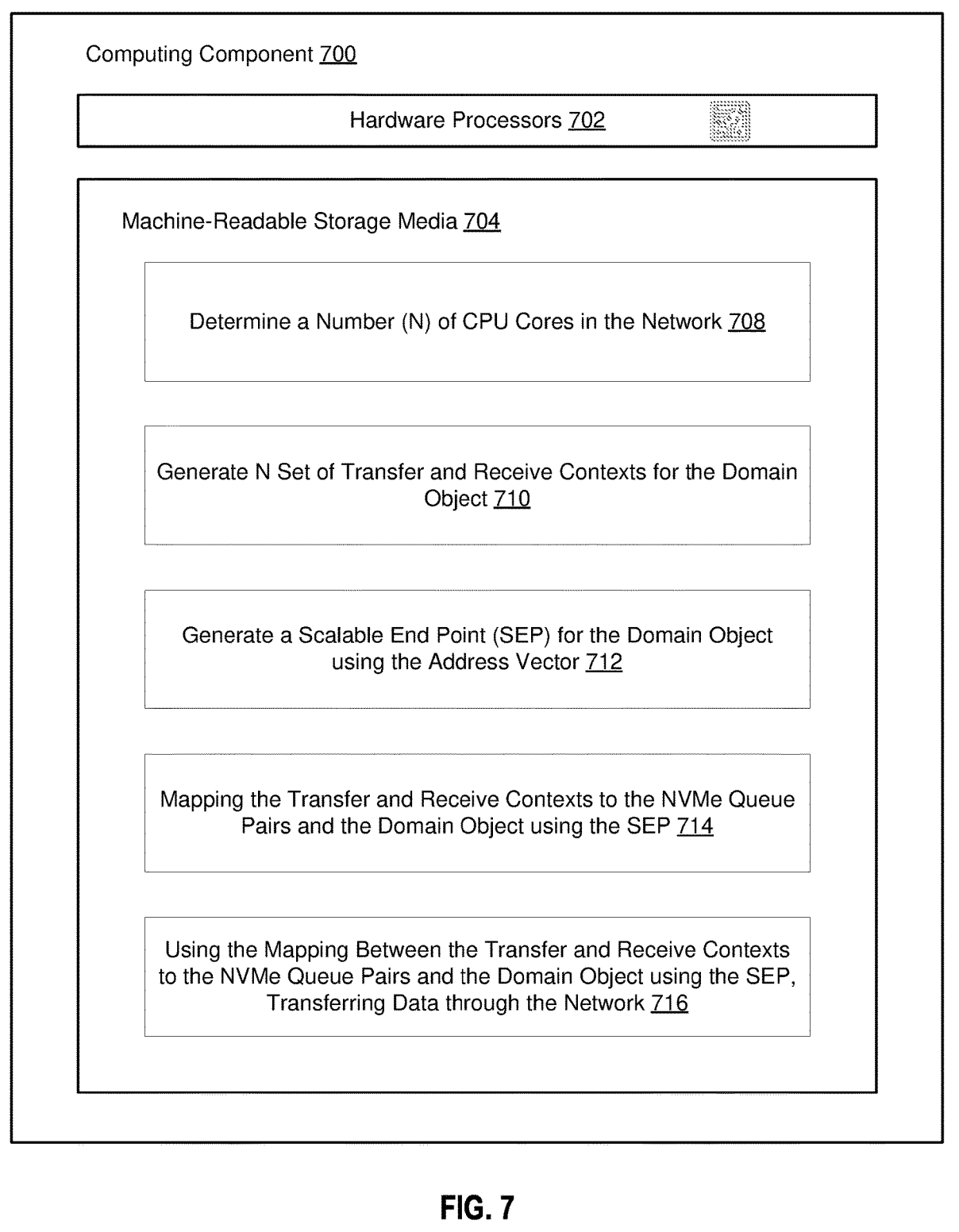

Computing Component 700

Hardware Processors 702

Machine-Readable Storage Media 704

Determine a Number (N) of CPU Cores in the Network 708

Generate N Set of Transfer and Receive Contexts for the Domain Object 710

Generate a Scalable End Point (SEP) for the Domain Object using the Address Vector 712

Mapping the Transfer and Receive Contexts to the NVMe Queue Pairs and the Domain Object using the SEP 714

Using the Mapping Between the Transfer and Receive Contexts to the NVMe Queue Pairs and the Domain Object using the SEP, Transferring Data through the Network 716

FIG. 7

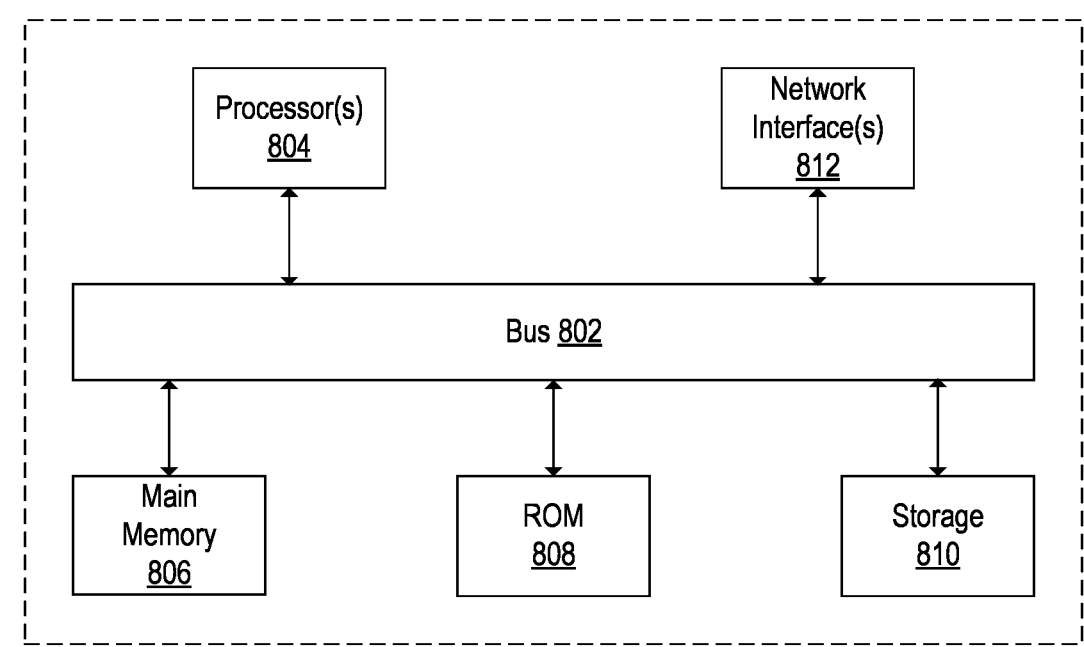
FIG. 8

ALLOWING NON-VOLATILE MEMORY EXPRESS (NVMe) OVER FABRIC (NVMe-oF) TRAFFIC OVER INTERFACES USING A SCALABLE END POINT (SEP) ADDRESSING MECHANISM

BACKGROUND

Non-Volatile Memory express (NVMe) is an open, logical device interface specification for accessing a computer's non-volatile storage media. NVMe is designed to capitalize on the low latency and internal parallelism of solid-state storage devices. NVMe over Fabric (NVMe-oF) is an extension of the NVMe network protocol to Ethernet and Fiber Channel delivering faster and more efficient connectivity between storage and servers, as well as a reduction in central processing unit (CPU) utilization of application host servers. The NVMe-oF protocol can help bridge the gaps between direct-attached storage and storage area networks, enabling organization to support workloads that require high throughput and low latency.

BRIEF DESCRIPTION OF THE DRAWINGS

The present disclosure, in accordance with one or more various examples, is described in detail with reference to the following figures. The figures are provided for purposes of illustration only and merely depict typical or exemplary examples. These figures are provided to facilitate the reader's understanding of the disclosed technology and shall not be considered limiting of the breadth, scope, or applicability thereof. It should be noted that for clarity and ease of illustration these drawings are not necessarily made to scale.

FIG. 7 is an illustration of an example computing component that includes one or more hardware processors and machine-readable storage media storing a set of machine-readable/machine-executable instructions that, when executed, cause the one or more hardware processors to perform an illustrative method for establishing communication links between a domain object and a network using a SEP, according to an example described in the present disclosure.

FIG. 8 illustrates a block diagram of an example computer system in which various examples of the present disclosure may be implemented.

Figure 1:
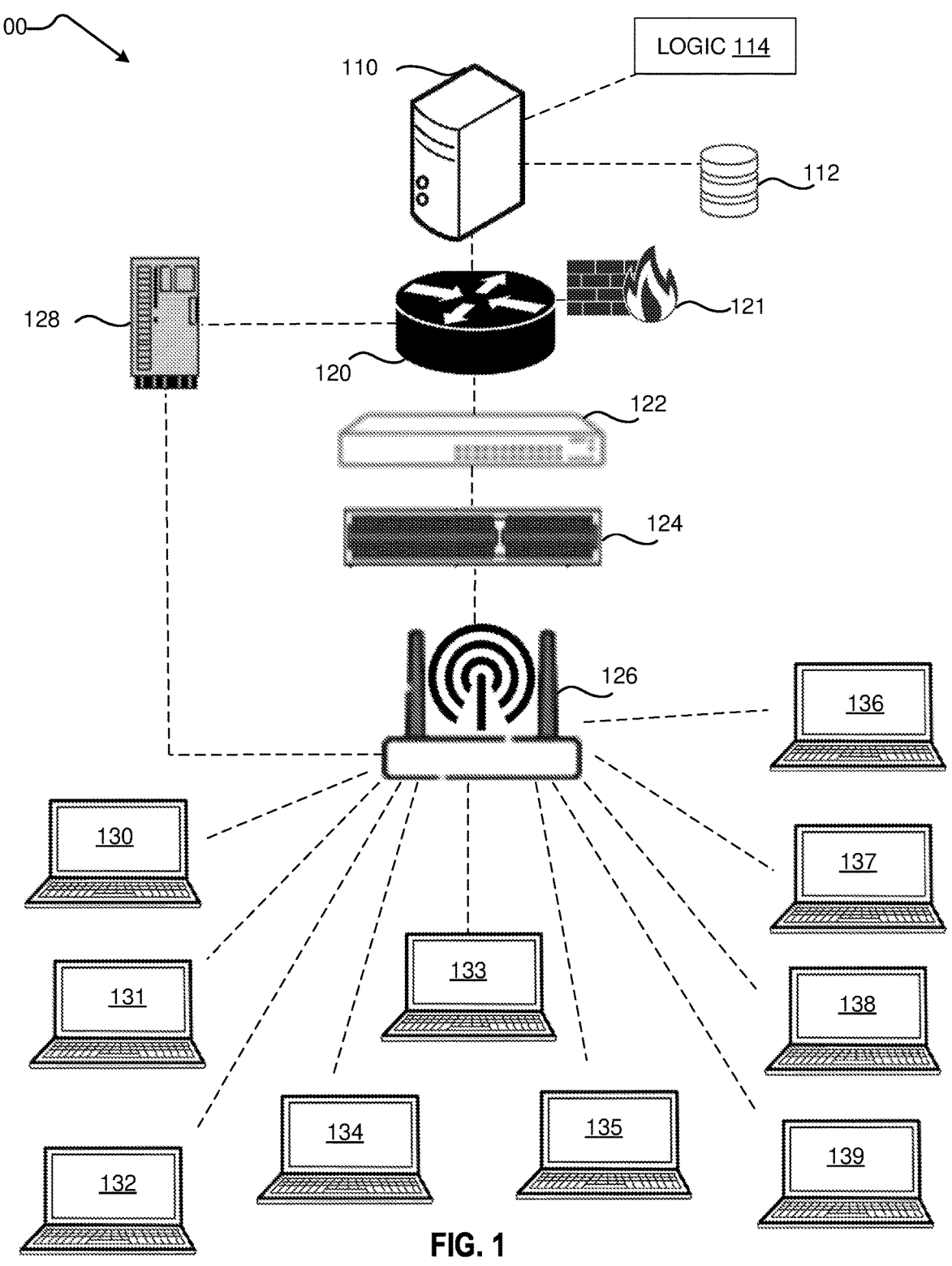
FIG. 1 is an illustration of an example computing system of a network device, according to an example described in the present disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Traditional systems of NVMe-OF specifications require the creation of a plurality of queues to establish connections links between a plurality of devices, such as NVMe devices. A large amount of memory is required for the creation of the queues for the connection links. Scalable End Points (SEPs) refer to a mechanism to address issues regarding the large amount of memory needed for data storage to facilitate connection links between devices. While the concept of SEPs may address such memory issues and provide performance improvements, current systems do not utilize SEPs to facilitate connection links between devices. Traditional systems may require a large amount of memory for data storage to facilitate the connection links between a plurality of devices in a network.

For example, traditional systems may create a set of queues that establish data transfer connections between devices, such as a host (e.g., an NVMe device, storage device) and a client (e.g., a network) of a plurality of devices consisting of CPU cores. The created queues can facilitate a data transfer connection with the host that may allow for data to be transferred to each of the plurality of NVMe devices. This traditional system architecture is not optimal, as it requires a large amount of memory for each set of queues that is created. Also, a large amount of memory is used to store data to facilitate all of the connections between the CPU cores of a network and host devices (e.g., the remote addressing data of each set of queues) when the network includes thousands of nodes running thousands of CPU cores with multiple clients connected to the network.

Examples of the disclosure may provide systems and methods configured to establish improved data transfer connections between the host and the other devices in a network by utilizing a SEP. Using the SEP may decrease the amount of memory needed for data storage. For example, the SEP may use a reduced and constant memory footprint associated with the connection resources regardless of the number of other devices (e.g., CPU cores, NVMe devices) in the network. Some examples of the disclosure may generate the SEP to establish connections between a single host device and CPU cores of other devices in a network. In some examples, the systems and methods may create queues for each connection between the host device and a CPU core of one of the other devices in the network, and use the SEP to reduce the amount of memory needed. The amount of memory may be small (in comparison to other memory usage) and relatively constant for the data storage. The memory scheme may cover one or more queues for connections to CPU cores in the network. In this way, the SEP may allow the single host device to have data transfer connections with each CPU core of the other devices in the network without using large amounts of memory and negatively affecting the processing performance of the data transfers performed.

In some examples, the SEP addressing mechanism may enable NVMe-oF traffic over interfaces. The SEP may be used to establish communication connections between one or more host devices of a domain object and one or more CPU cores of devices in a network to allow the transmittance of one or more messages and data. The domain object may represent a domain that may include one or more devices, such as, for example, host devices, that are present within the same domain. The network may include one or more devices, such as, for example, client computing devices, and each device in the network may include a CPU core that runs operations of the respective device. The SEP may be generated using an address vector that is used to store remote addresses of devices in the network, including, for example, the remote addresses of CPU cores of the devices in the network, the remote address of the domain object, and the remote addresses of the one or more host devices of the domain object. The address vector may reduce the memory requirements needed to store remote addressing data.

To establish communication connections between host devices of a domain object and CPU cores of devices in a network, the SEP may align a domain object connection of the domain object to a number/value/set (hereinafter "N" used interchangeably with number, value, or set) of CPU core connections of the devices in the network. In some examples, each CPU core of a device in the network may have a corresponding CPU core connection with the network. Each of the CPU core connections may be used as a communication connection between the respective CPU core of a device and another device connected to the network. The network may have an N number of devices with an N number of CPU cores and CPU core connections. Each of the CPU core connections may include a non-volatile memory express (NVMe) queue pair, creating a set of NVMe queue pairs. The NVMe queue pair may be used to transfer messages and data between the respective CPU core of a device and other devices connected to the network, using the respective CPU core connection.

The domain object may have a domain object connection that may allow messages and data to be transferred between each host device of the domain object and other devices in the network. The domain object connection may include an N set of transmit and receive contexts for the domain object to match the N of CPU cores of devices in the network. The SEP may align the domain object connection of the domain object to the N CPU core connections of the devices in the network by linking the N set of transmit and receive contexts of the domain object connection to the N set of NVMe queue pairs of the CPU core connections. Aligning a set of transmit and receive contexts to a CPU core connection may associate and map the communication connections to each other.

Each set of the N sets of transmit and receive contexts of the domain object connection may be mapped to a different NVMe queue pair of the CPU core connections, to establish a 1-to-1 mapping connection between the domain object and each of the CPU cores in network. In this way, one or more messages and data that is transmitted between the domain object to a CPU core of a device of the network may use a particular set of transmit and receive contexts in domain object connection that is associated with the connection of CPU core connections of the respective CPU core of the network. For example, a first host device of a domain object may want to communicate with and transmit data between a first CPU core. The SEP may use the CPU core connection of the first CPU core and the set of transmit and receive contexts of the domain object connection associated to the first CPU core to transmit data between the first host device of the domain object and the first CPU core.

A N number of completion queues may be generated for the domain object. Each of the N completion queues may be used to store events or operations (hereinafter, "operations") that have been completed between the domain object and the network. An operation may include, for example, transmitting a message or data, receiving a message or data, reading a message or data, and writing a message or data between the domain object and the network. The N completion queues may record each operation that has been completed between the domain object and the network. This may include recording each completed operation between each and every client device of the domain object and the network.

Each completion queue of the N completion queues for the domain object may be associated to a different set of the N sets of transmit and receive contexts of domain object connection. Each completion queue of the N completion queues may further be associated to a respective CPU core connection of CPU core connections that is aligned to the respective set of transmit and receive contexts of domain object connection. Each completion queue of the N completion queues may thus be associated to a different CPU core of the network. In this way, each completion queue of the N completion queues will track and record the operations that are performed and completed between the domain object and the respective CPU core of the respective device in the network. This may allow the recording and separation of records of operations occurring between the domain object and of each CPU core of each device in the network.

An event queue for the domain object may also be generated. The event queue may be used to track data transfers that are flowing through the domain object. Data transfers flowing through the domain object may include any data transfers that are received from or transmitted to any of the one or more host devices in the domain object. In this way, the event queue may be used to track all data transfers that are occurring between the domain object and the network.

The SEP may be defined by characteristics which can include a network address and specified port of the domain object. The network address and specified port of the domain object may indicate that the SEP is designated for the domain object. As alluded to above, the SEP may establish communication connections between the one or more host devices in a domain object and each of the CPU cores of the devices in a network. The SEP may improve the amount of memory required to establish the communication connections between the domain object and all of the CPU cores in the network. Using the SEP may establish all of the connections between host devices in the domain object and all of the CPU cores in the network using only a small and constant amount of memory. In this way, a small and constant amount of memory is only required to establish data transfer connections between a domain object and CPU cores, regardless of the number of CPU cores of devices in the network. The SEP may have the additional benefit of using a single, base address of the address vector for multiple sets of transmit and receive contexts. By using a single, base address (also referred to as a single transport level address), the memory requirements needed to store remote addressing data may be reduced.

SEPs may allow for multiple, independent transmit and receive contexts to be created. In some examples, the SEPs may resemble the "multi-queue" concept in networking and may improve the performance of multi-threaded and parallel applications, by allowing threads access to independent transmit and receive context queues. Hence, in cases where an application has many processing connections, by assigning each connection its own transmit and receive context queue, the application can avoid serializing (i.e., locking)

access to hardware queues. SEPs have the additional benefit of allowing the creation of multiple transmit and receive contexts whose addresses can be computed to use a single, base address and having a single transport level address (i.e., address vector), making a SEP more beneficial than a standard endpoint. In other words, using a SEP with an address vector can resolve the large memory issue for connection links of current systems by reducing the memory requirements needed to store all remote addressing data.

Technical improvements may be realized throughout the disclosure. For example, using SEPs can reduce the amount of memory used to establish data transfer connections between a single host device (e.g., an NVMe device, storage device) and a network consisting of CPU cores of devices (e.g., client devices).

In some examples, the described systems and methods can also reduce the overhead processing that are associated with the memory registration in a Remote Direct Memory Access (RDMA) operation. For example, in a typical NVMe-OF RDMA operation involving an initiator and a target, the NVMe-oF specification may perform a memory registration operation in the target, passing the address and access keys to the initiator. The initiator may perform an allocation of receive buffers, register with the initiator RDMA NIC and then place a send request with the target's registered virtual address and permission key. The target RDMA NIC may subsequently look up the permission key and perform the read or write operation on the memory address. As this model registers the target side memory buffers prior to the data transfer, there is overhead processing to configure hardware and tear down the components. The described system can avoid expensive memory registration operations associated with the traditional RDMA based transfers, thus improving performance.

In some examples, the SEP for NVMe-OF solution may also enable the advantages listed above to be realized in an NVMe-OF context. In traditional systems, NVMe queues are aligned to CPU cores so that Input/Output (I/O) submissions can take advantage of the core affinity. Here, the described systems and methods may pair the NVMe queues with transmit (TX)/receive (RX) contexts and corresponding completion queues (CQ) of a client device. This correlation can create a 1-to-1 mapping between the client device and each of the CPU cores of devices in a network.

FIG. 1 is an illustration of an example computing system 100 including one or more computing components that may encompass any of a server 110, a router 120, a switch 122, a network controller 124, an access point 126, and a DHCP server 128. In some examples, the router 120 may be associated with a firewall 121. The server 110 may further include or be associated with a database or cache 112 (hereinafter "database") which stores attributes of particular client devices, storage devices, and access control lists or policies associated with particular computing devices, such as computing devices 130-139, which connect to a network via the access point 126. In some examples, any or all of the computing devices 130-139 may include plug and play devices. Although only ten computing devices are illustrated in FIG. 1, a greater or lesser number of computing devices may be implemented. For example, any number of computing devices may be connected to the network via the access point 126.

The database 112 may be integrated or embedded within the server 110 or spatially separated from the server 110. The access control lists may be stored as files and/or may be indexed. In some examples, the access control lists or policies may include particular access levels and/or access privileges to be assigned to each computing device depending on a group or classification that the computing device belongs to. For example, the access privileges may indicate a subset (e.g., a portion or all) of data resources, such as particular data servers, databases, platforms, objects, file directories, storage areas or files that each computing device is authorized to access, particular protocols (e.g., Hypertext Transfer Protocol (HTTP) or File Transfer Protocol (FTP)) that each computing device may utilize to access data resources, a transmission speed or rate to be provided to each of the computing devices, one or more Vendor Specific Attributes (VSA), and/or a particular VLAN to be assigned to each computing device. In some examples, the VSA may include bandwidth on incoming and/or outgoing traffic, and download and/or upload speeds. The access control lists or policies may be stored in the database 112 of the server 110, rather than at other computing components such as the router 120, so that the server 110 may centrally update the access control lists or policies and propagate any updates to other computing components in the network.

Each of the computing components may include one or more hardware processors and logic that implements instructions to carry out the functions of the computing components. For example, server 110 may include or be associated with one or more hardware processors and logic 114 that implements instructions or protocols to carry out the functions of the server 110. The logic 114 may execute instructions to perform one or more steps in generating a SEP to establish connections between host devices (e.g., storage devices) of a domain object and computing devices (e.g., client devices) of a network, and in performing operations to read and write data between the host devices and computing devices.

Figure 2:
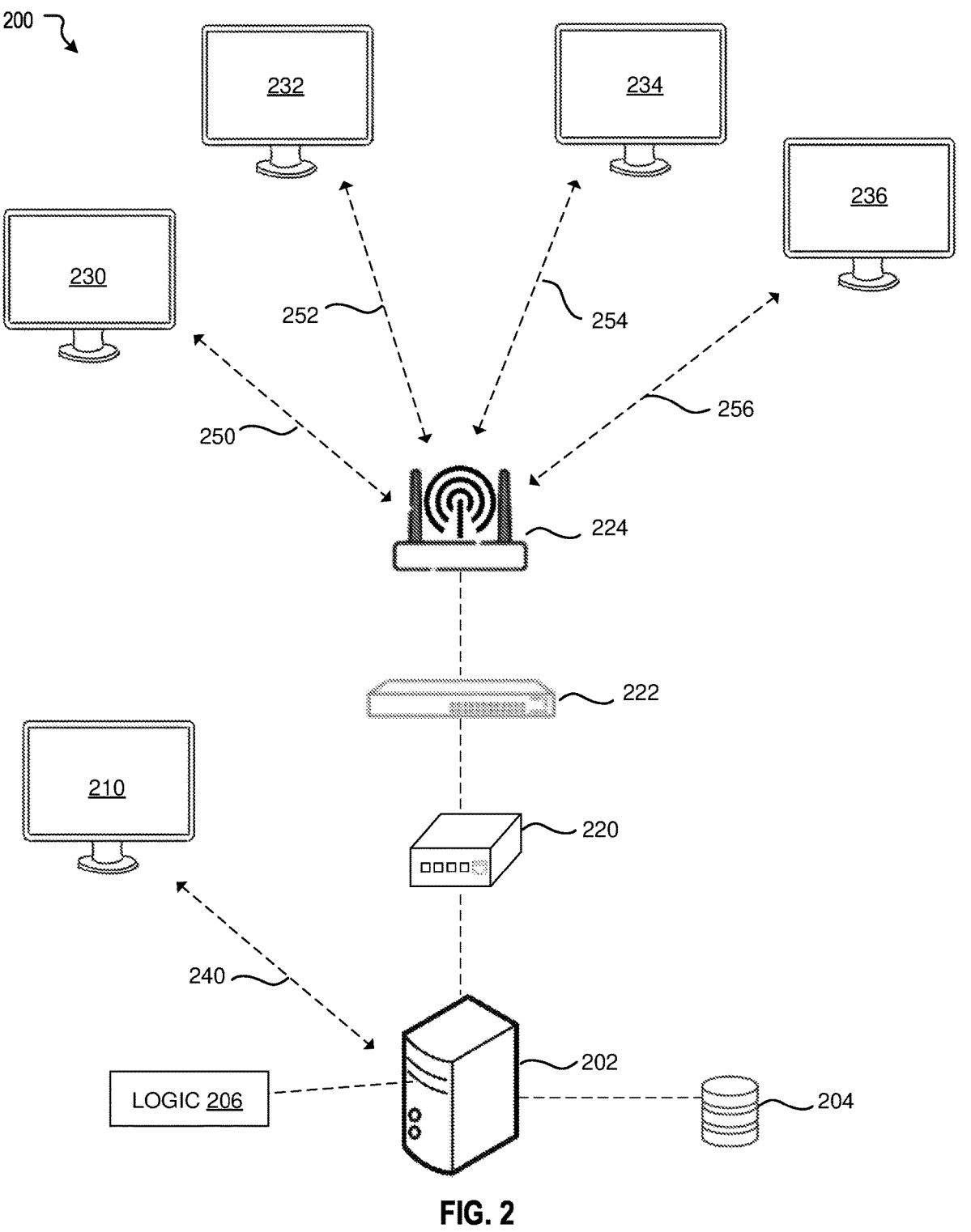
FIG. 2 is an illustration of an example computing system of a network for establishing communication links between a network device and a client device, according to an example described in the present disclosure.

FIG. 2 is an illustration of an example network 200 over which communication connections are implemented in accordance with various examples of the present disclosure. In some examples, the network 200 can comprise or include one or more computing components that may encompass any of the server 202, a network device 220, a network controller 222, an access point 224, and devices 210, 230, 232, 234, and 236. FIG. 2 may illustrate an exchange of information among components. The server 202 may be, for example, the server 110 of FIG. 1.

The network 200 may include a plurality of network devices, including network device 220, network controller 222 and access point 224. The devices 210, 230, 232, 234, and 236 can be any of computing devices, such as computers, storage devices, mobile phones, tablet devices, etc. The devices 210, 230, 232, 234 and 236 may be implemented as any of computing devices 130-139 of FIG. 1. The network device 220 may be implemented as the router 120, switch 122, or network controller 124 of FIG. 1. The network device 220 may be configured to connect various computing components in a network, such as the device 210, device 230, device 232, device 234, device 236, network controller 222, access point 224, and server 202 in network 200. The server 202 may further include or be associated with the database or cache 204 (hereinafter "database 204") which stores attributes of particular client devices, storage devices, and access control lists or policies associated with the devices 210, 230, 232, 234, and 236, which connect to a network, such as network 200, via an access point, such as access point 224.

In some examples, the devices 210, 230, 232, 234, and 236 can access the internet, wirelessly, through Wi-Fi (e.g., IEEE 802.11), Bluetooth (e.g., IEEE 802,15,1), or cellular connection (e.g., long-term evolution, $5^{th}$ generation cellular networks, etc.) to wirelessly access the server 202 through the network device 220 and/or access point 210. The server 202 can implement software and/or hardware, such as web servers, application server, communications server, database server, etc. The server 202 can access the internet through Wi-Fi, Bluetooth, phone line, or LAN/WLAN network interface. In other examples, the network device 220 can be an enterprise intranet (e.g., a private network) and the devices 210, 230, 232, 234, and 236 can access the enterprise intranet, wirelessly, through the network device 220 to access data files, storage files, or other enterprise data. In some cases, the network device 220 can be a network link (e.g., Wi-Fi, Ethernet port, router, switch, etc.) that allows a plurality of computing components to communicate with each other. The network controller 222 and the access point 224 can be configured to allow computing components in a network, such as the device 210, device 230, device 232, device 234, device 236, and server 202 to connect through the network device 220. In this example, the network device 220 can establish a device-to-device communication between the device 210 and each of the devices 230, 232, 234, and 236.

In some examples, a communication connection may be established between device 210 and each of the other devices 230, 232, 234 and 236 in the network 200. Each of the devices 210, 230, 232, 234 and 236 may have a communication link with the network 200, such as communication links 240, 250, 252, 254 and 256. The server 202 can be configured to act as a link to establish the device-to-device communication between the device 210 and each of the devices 230, 232, 234, and 236, using the communication links 240, 250, 252, 254 and 256. The server 202, and the devices 210, 230, 232, 234, and 236 may connect to one another in the network 200 via the network device 220, the network controller 222, and/or the access point 224. The network device 220, network controller 222 and access point 224 may be a few of a plurality of network devices in the network, including other network devices, controllers and access points. The network 200 may allow each computing device in the network to communicate to one another. The device 210 may connect to any of the plurality of computing devices in the network 200. The devices 210, 230, 232, 234 and 236 may be a few of a plurality of devices that can connect to the access point 224 in the network 200.

Figure 3:
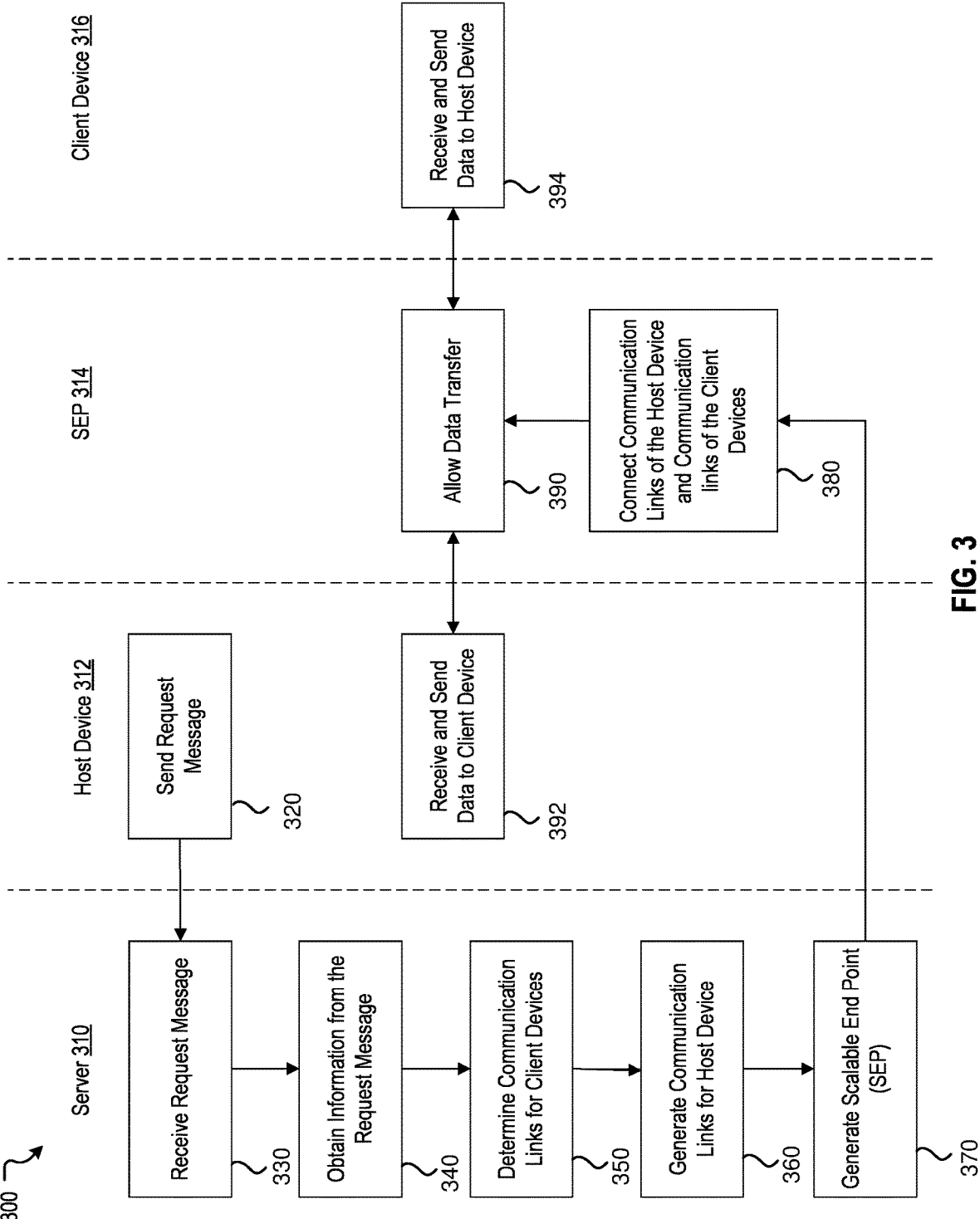
FIG. 3 is an illustration of an example process of implementing communication connections in a network, according to an example described in the present disclosure.

FIG. 3 is an illustration of an example process 300 of implementing communication connections in a network in accordance with various examples of the present disclosure. Server 310, host device 312, SEP 314, and client device 316 are illustrated.

At block 320, a host device 312 may send a request message to a server 310 of a network. The request message may include a request to establish communication connections between the host device 312 and one or more client devices, such as client device 316, in the network. In some examples, SEP 314 for the domain object may not be generated prior to receiving the request. In some examples, communication connections between host device 312 and client device 316 may be established within a time threshold of receiving the request message.

At block 330, the server 310 may receive a message from the host device 312. Messages from the host device 312 may include data packets (e.g., unicast and multicast), reports (e.g., Buffer Status Report (BSR), Quality of Service (QOS) NULL data frames, Transmission Control Protocol (TCP) acknowledgements, etc.). The message received by the server 310 from the host device 312 may include a request to establish communication connections between the host device 312 and one or more client devices in the network, such as client device 316.

At block 340, the server 310 may be read and extract information from the request message received from the host device 312. After the server 310 receives the request message from the host device 312, requesting to establish communication connections with the other devices in the network, such as client device 316, the server 310 may read the request message to obtain identity information of the host device 312. The identity information may include, without limitation, source device address, destination device addresses, source device port, destination device ports, and/or attributes such as source device type, destination device types, length of frames or size of packets transmitted, number of frames or number of packets transmitted, variance in sizes of frames or packets, variance in lengths of frames or packets, frequency of packets, frequency of frames, and/or overall size of data within the frames or packets. In some examples, the request message may include services that are advertised or queried for, such as a video stream, videoconferencing, or Internet Protocol television (IPTV).

The server 310 may record and store the identity information into a database. For example, once the server 310 has read and obtained the identity information from the request message at a first time, the server 310 may store the information at a second time. The server 310 may further analyze the identity information of the request message, along with stored identity information of previously sent messages in the database. The server 310 to monitor the total quantity of messages being transmitted from each device in the network by, for example, allowing identity information to be stored in the database and using the server 310 to analyze the stored identity information in the database along with the identity information of the request message. The monitored messages may include messages to/from host device 312 and client device 316.

At block 350, the server 310 may determine the communication links for the client devices in the network, including client device 316. The network may include one or more client devices, such as client device 316. Each client device in the network may include a CPU core that runs operations of the respective client device. Each CPU core of a client device in the network may have a corresponding CPU core connection with the network. Each of the CPU core connections may be used as a communication connection between the respective CPU core of a client device and another device connected to the network, such as host device 312.

The network may have a number (N) of client devices with an N of CPU cores and CPU core connections. Each of the CPU core connections may include a non-volatile memory express (NVMe) queue pair. The NVMe queue pair may be used to transfer messages and data between the respective CPU core of a client device and other devices connected to the network, using the respective CPU core connection. The server 310, using one or more hardware processors, database and logic, may determine the number (N) of client devices, such as client device 316, presently associated with the network. By determining the number (N) of client devices, the server 310 may subsequently determine the number (N) of CPU cores, CPU core connections and NVMe queue pairs.

At block 360, the server 310 may generate communication links for the host device 312. A set of communication links, such as transmit and receive contexts, may be generated for the host device 312. The number of communication links in the set for the host device 312 may be the same as the number (N) of client devices presently associated with the network.

At block 370, the server 310 may generate a SEP for the host device 312. To establish a SEP, such as SEP 314, for the host device 312, an address vector for the host device 312 may be generated. The address vector may store remote addresses of the client devices in the network, such as client device 316, to allow the host device 312 to communicate with each of the client devices in the network. The address vector may be used to generate SEP 314 for the host device 312 to be used to establish a communication connection between the host device 312 and each of the client devices in the network, including client device 316. The SEP 314 may be implemented as a network device, such as network device 220 of FIG. 2 and network device 126 of FIG. 1, in the network. The SEP 314 may use the address vector to establish connectionless fabrics of communications between devices, such as between the host device 312 and client device 316. SEP 314 may be implemented as any of devices 220, 222 or 224 of FIG. 2.

At block 380, the SEP 314 may be used to establish communication connections between the host device 312 and the client device 316. The server 310 may use the SEP 314 to map the set of communication links for the host device 312 with each of the communication links of the client devices in the network, such as client device 316. Each communication link of the set of communication links for the host device 312 may be aligned and linked to a different communication link of the client devices in the network, to establish 1-to-1 mapping of communication connections between the host device 312 and each of the client devices, such as client device 316.

At block 390, once communication connections are established between the host device 312 and each of the client devices, such as client device 316, the SEP 314 may allow messages to be sent and received between the host device 312 and any of the client devices, such as client device 316. The SEP 314 may be used to transmit data between host device 312 and each of the client devices in the network, including client device 316. The SEP 314 may also be used to track the performance of operations, such as, for example, transmit operation, receive operation, read operation and write operation, that are occurring between the host device 312 and each of the client devices in the network. Many variations are possible.

At block 392, host device 312 receives and sends data to client device 316. At block 394, client device 316 receives and sends data to host device 312. For example, host device 312 may send a message, including, for example, a command to perform a read operation or a write operation. The read operation may include, for example, a request for the host device 312 to read data from the client device 316 in the network. The write operation may include, for example, a request to write data from the host device 312 to the client device 316 in the network.

Figure 4:
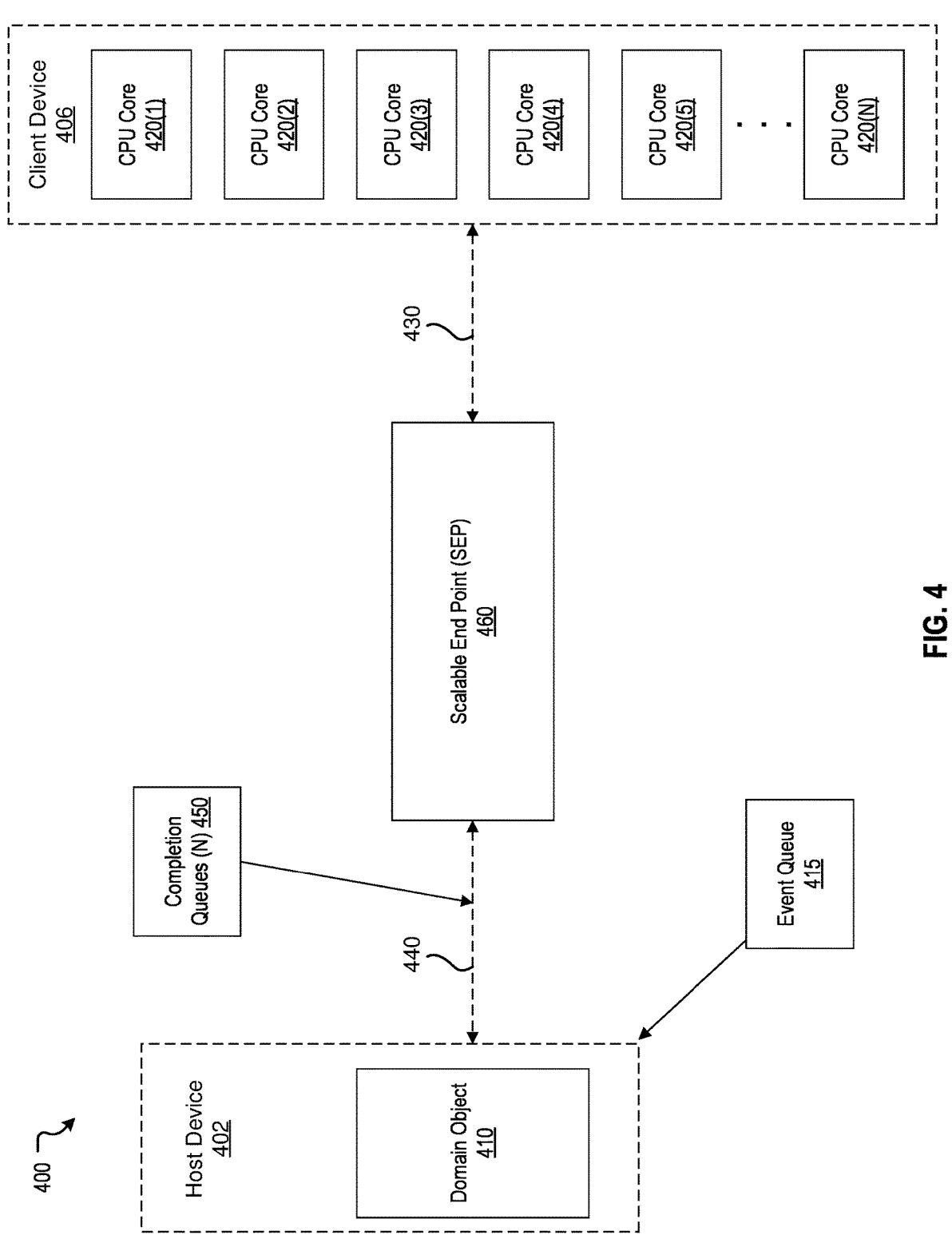
FIG. 4 is an illustration of an example network for establishing communication links between a domain object and CPU cores using a Scalable End Point (SEP), in accordance with an example described in the present disclosure.

FIG. 4 is an illustration of an example network 400. As described herein, a SEP 460 may be generated and used to establish data transfer connections between a domain object 410 and a plurality of CPU cores 420 of devices 406 in a network. In some examples, one of the CPU cores 420 of network 400 may request to establish a connection with a domain object, such as domain object 410. The domain object 410 may represent a domain that may include one or more devices, such as, for example, host device 402, that are present within the same domain. A message may be sent from the network 400 to the domain object 410. The message may include, for example, a request to establish a communication connection between the domain object 410 and the network 400. The message may be sent from a CPU core of network 400 that wants to establish a communication connection with a host device 402 in the domain object 410. The message may be sent from each of the CPU cores of network 400 that want to establish a communication connection with the one or more host devices in the domain object 410. Many variations are possible.

The network 400 may include one or more computing devices, such as, for example, client computing devices 406. Each client computing device 406 in the network 400 may include a CPU core, such as CPU cores 420. The network 400 may include a number (N) of CPU cores 420 based on the number (N) of client computing devices 406 in the network 400. Each CPU core 420 may have a corresponding connection with the network 400. The connection of all of the number (N) of CPU core connections for the N of CPU cores 420 may be represented by CPU core connections 430. Each of the connections of CPU core connections 430 may be used to as a communication connection between the respective CPU core 420 of a client computing device 406 and another device connected to the network 400. Each of the CPU core connections 430 may include an NVMe queue pair. The NVMe queue pair may be used to transfer messages and data between the respective CPU core 420 of a client computing device 406 and other devices connected to the network 400.

A communication connection, such as domain object connection 440, may be generated between the network 400 and the domain object 410. The domain object connection 440 may allow messages and data to be transferred between the domain object 410 and the network 400. The domain object connection 440 may allow messages and data to be transferred between each host device 402 of the domain object 410 and the network 400. The domain object connection 440 may include sets of transmit and receive contexts for the domain object. The number of sets of transmit and receive contexts may be the same number (N) as the CPU cores 420 of devices in the network 400. Each set of the N sets of transmit and receive contexts in the domain object connection 440 may be aligned with one of the N CPU core connections 430. Aligning a set of transmit and receive contexts to a CPU core connection may associate and map the communication connections to each other.

A number (N) of completion queues 450 may be generated for the domain object 410. Each of the N completion queues 450 may be used to keep track of events or operations (hereinafter, "operations") that have been completed between the domain object 410 and the network 400. An operation may include, for example, transmitting a message or data, receiving a message or data, reading a message or data, and writing a message or data between the domain object 410 and the network 400. The N completion queues 450 may record each operation that has been completed between the domain object 410 and the network 400. This may include recording each completed operation between each and every host device 402 of the domain object 410 and the network 400.

Each completion queue of the N completion queues 450 for the domain object 410 may be associated to a different set of the N sets of transmit and receive contexts of domain object connection 440. Each completion queue of the N completion queues 450 may further be associated to a respective CPU core connection of CPU core connections 430 that is aligned to the respective set of transmit and receive contexts of domain object connection 440. Each completion queue of the N completion queues 450 may thus be associated to a different CPU core 420 of network 400. In this way, each completion queue of the N completion queues 450 will track and record the operations that are performed and completed between the domain object 410 and the respective CPU core 420 of the respective device in the network 400. This may allow the recording and separation of records of operations occurring between the domain object 410 and of each CPU core 420 of each device 406 in the network 400.

A scalable end point (SEP), such as SEP 460, may be generated for the domain object 410. SEP 460 may link the domain object connection 440 for the domain object 410 to the CPU core connections 430 of all of the CPU cores 420 of devices 406 in network 400. The SEP 460 may improve the amount of memory required to establish the communication connections between domain object 410 and all of the CPU cores 420 in the network 400. The SEP 460 may closely resemble the "multi-queue" concept in networking and may improve the performance of multi-threaded and parallel applications, by allowing threads to access independent transmit and receive context queues. SEP 460 may have the additional benefit of using a single address for multiple sets of transmit and receive contexts. By using a single, base address (also referred to as a single transport level address), the memory requirements needed to store remote addressing data may be reduced.

The single, base address of the SEP 460 may be generated to be used for the N sets of transmit and receive contexts of domain object connection 440. The single, base address of the SEP 460 may be an address vector. The address vector for the SEP 460 may be used for storing remote addresses for connectionless fabrics. The address vector may store remote addresses of devices in the network 400, including, for example, the remote addresses of the N CPU cores 420 of the devices 406 in the network 400, the remote address of the domain object 410, and the remote addresses of the one or more host devices 402 of the domain object 410. The address vector may reduce the memory requirements needed to store remote addressing data. The address vector for the SEP 460 may be used to generate SEP 460. The SEP 460 may also include a network address and specified port of the domain object 410, indicating that the SEP 460 is designated for the domain object 410. The SEP 460 may establish communication connections between each of one or more host devices 402 in the domain object 410 and each of the CPU cores 420 of the network 400 with only a small and constant amount of memory being used for all of the queues of all of the connections to all of the CPU cores in the network. In this way, a small and constant amount of memory is only required to establish data transfer connections between a domain object and CPU cores, regardless of the number of CPU cores of devices in the network.

The SEP 460 may be used to establish the complete communication connections between the domain object 410 and each of the N CPU cores 420 of devices 406 in network 400. The SEP 460 may be used to establish the complete communication connections between each of the one or more host devices 402 in the domain object 410 and each of the N CPU cores 420 of devices 406 in network 400. The SEP 460 may establish connectionless fabrics of communications between the domain object 410 and each of the N CPU cores 420 in network 400.

To establish the complete communication connections, the SEP 460 may be used to map the N sets of transmit and receive contexts of the domain object connection 440 to the NVMe queue pairs of the CPU core connections 430. Each set of the N sets of transmit and receive contexts of the domain object connection 440 may be mapped to a different NVMe queue pair of the CPU core connections 430, to establish a 1-to-1 mapping connection between the domain object 410 and each of the CPU cores 420 in network 400. In this way, one or more messages and data that is transmitted between the domain object 410 to a CPU core 420 of a device 406 of the network 400 may use a particular set of transmit and receive contexts in domain object connection 440 that is associated with the connection of CPU core connections 430 of the respective CPU core 420 of the network 400. For example, a host device 402 of domain object 410 may want to communicate with and transmit data between CPU core 420(1). The SEP 460 may use the connection of the CPU core connections 430 that is associated with CPU core 420(1) and the associated transmit and receive contexts of domain object connection 440 to transmit data between the host device 402 of domain object 410 and the CPU core 420(1). The completion queue of the N completion queues 450 associated with the CPU core 420(1) may be used to track and record the operations that are performed and completed between each of the one or more host devices 402 of domain object 410 and the respective CPU core 420(1) of the network 400.

The SEP 460 may allow the transmittance of one or more messages and data between the host devices 402 of the domain object 410 and the CPU cores 420 of the devices 406 in the network 400. Each of the communication connections established from using the SEP 460 may represent a 1-to-1 mapping between the domain object 410 and one CPU core 420 in the network 400. Each host device 402 of the domain object 410 may use the same communication connection to transmit and receive one or more messages and data to the respective CPU core 420 in the network 400 that the communication connection is associated with. The SEP 460 may only use a small and constant amount of memory for all of the queues of all of the connections between the domain object 410 and all of the CPU cores 420 in the network 400. A single host device 402 of the domain object 410 may have communication connections with each CPU core 420 in the network 400 without using large amounts of memory and negatively affecting the processing performance of the communications, such as, for example, data transfers, performed.

Once communication connections are established between the domain object 410 and each of the CPU cores 420 of the devices 406 in the network 400 by using the SEP 460, messages and data may be transmitted (e.g., sent, received, transferred, etc.) between host device 402 of the domain object 410 and CPU cores 420 of the network 400. An event queue 415 for the domain object 410 may also be generated. The event queue 415 may be used to track data transfers that are flowing through the domain object 410. Data transfers flowing through the domain object 410 may include any data transfers that are flowing from or to any of the one or more host devices 402 in the domain object 410. In this way, the event queue 415 may be used to track all data transfers that are occurring with the domain object 410 to the network 400.

It should be appreciated that there can be additional, fewer, or alternative steps performed in similar or alternative orders, or in parallel, within the scope of the various examples discussed herein unless otherwise stated. The network 400 may be, for example, implemented as the server 110 of FIG. 1, the server 202 of FIG. 2, the server 310 of FIG. 3, the network 500 of FIG. 5, the network 600 of FIG. 6, the computing component 700 of FIG. 7 and the computing component 800 of FIG. 8.

Figure 5:
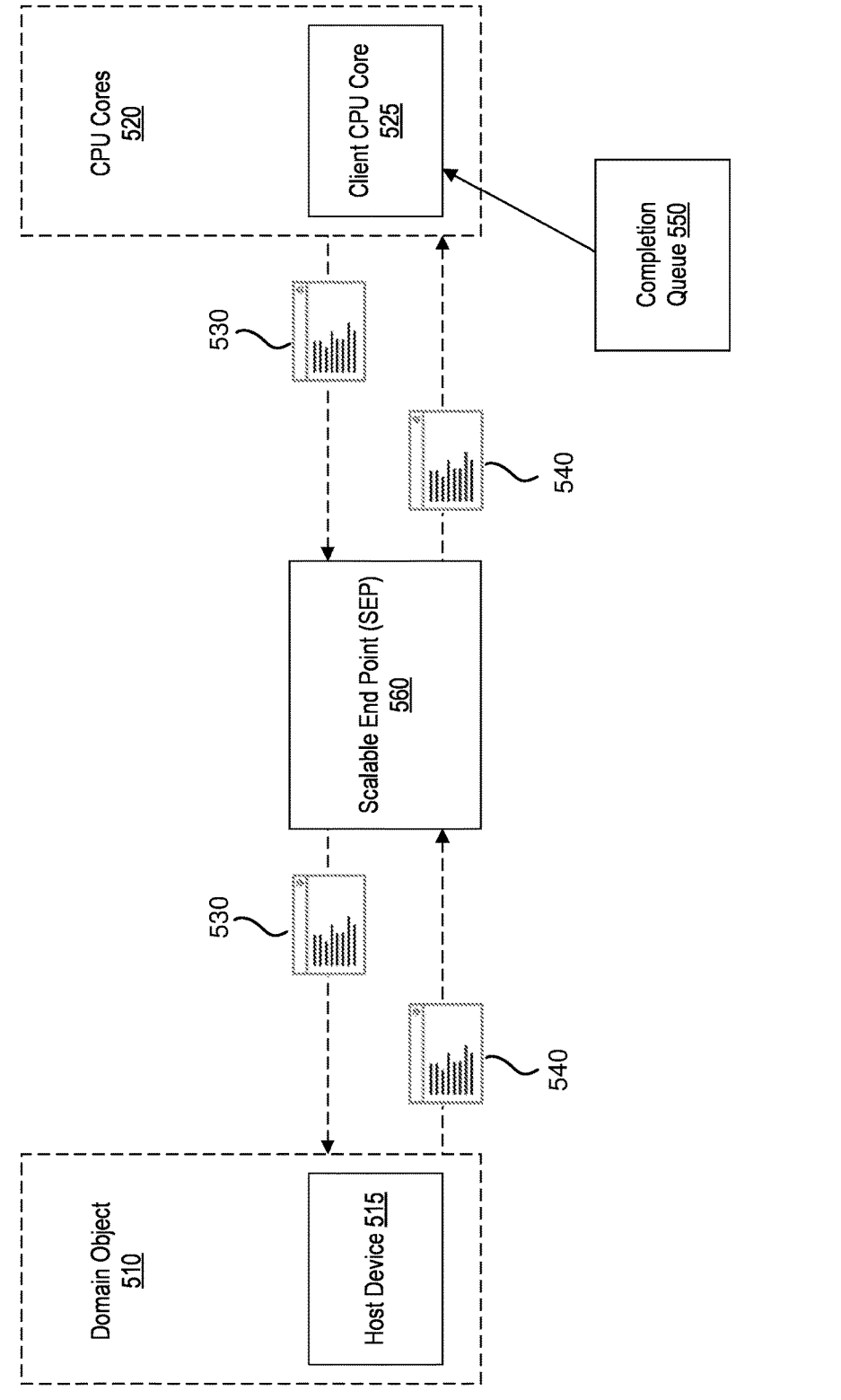
FIG. 5 is an illustration of an example network for performing a push operation between a host device and a client CPU core using a SEP, in accordance with an example described in the present disclosure.

FIG. 5 is an illustration of an example network 500 for performing a push operation between a host device, such as a storage device, and a client CPU core in a network using a SEP, in accordance with an example described in the present disclosure. Upon the establishment of communication connections between a domain object, such as domain object 510, and the CPU cores of devices in a network, such as CPU cores 520 of the network 500, using a SEP, such as SEP 560, one or more operations, such as, for example, a push operation, may be performed. The network 500, domain object 510, CPU cores 520 and SEP 560, may be implemented as, for example, network 400, domain object 410, CPU cores 420 and SEP 460 of FIG. 4.

A push operation may include sending a message, such as message 530, to a host device, such as host device 515, of the domain object 510 from a client CPU core, such as client CPU core 525, of the CPU cores 520 in the network 500 using the SEP 560. The message 530 may include a read operation that may include a command to read data from the host device 515. The message 530 may be sent to the host device 515 from the client CPU core 525 using the SEP 560. To send the message 530 to the host device 515 from the client CPU core 525, the SEP 560 may use the transmit and receive contexts and the CPU core connection associated with the client CPU core 525. The CPU core connection for the client CPU core 525 may have an NVMe queue pair that is used to transmit data between the SEP 560 and the client CPU core 525.

The message 530 may include a unique key tag. The unique key tag may include, for example, information of where the message 530 is sent from, where the message 530 is transmitting to, the data to be collected, the data to be written, the operations to be performed, etc. The host device 515 may receive the message 530 and a write operation may be performed of the data being requested from the host device 515. The data of the host device 515 may be written into a client tagged buffer for the client CPU core to read the data of the host device 515. A first completion event may be generated after the completion of the write operation of the data of the host device 515. The first completion event may indicate that the host device 515 received the message 530 and provided the data being requested. The first completion event may be recorded in the completion queue 550 that is associated with the client CPU core 525.

The client tagged buffer with the data of the host device 515 may be sent from the host device 515 to the client CPU core 525 using the SEP 560. The client tagged buffer may be stored in a message, such as message 540. To send the message 540 from the host device 515 to the client CPU core 515, the SEP 560 may use the transmit and receive contexts and the CPU core connection associated with the client CPU core 525. The CPU core connection for the client CPU core 525 may have an NVMe queue pair that is used to transmit data between the SEP 560 and the client CPU core 525. Upon receiving the message 540, the client CPU core 525 may read the message 540 to extract the data stored in the client tagged buffer in the message 540.

A second completion event may be generated after the client CPU core 525 receives the message 540 that includes the client tagged buffer of the data of the host device 515. The second completion event may indicate that the client CPU core 525 received the data of the host device 515 that was requested. The second completion event may indicate that the client CPU core 525 read the data of the host device 515 that was requested. The second completion event may be recorded in the completion queue 550 that is associated with the client CPU core 525. Any number of completion events may be generated and stored in completion queue 550 to indicate the completion of one or more operations between one or more host devices, such as host device 515, of domain object 510 and the client CPU core 525 of network 500.

It should be appreciated that there can be additional, fewer, or alternative steps performed in similar or alternative orders, or in parallel, within the scope of the various examples discussed herein unless otherwise stated. The network 500 may be, for example, implemented as the server 110 of FIG. 1, the server 202 of FIG. 2, the server 310 of FIG. 3, the network 400 of FIG. 4, the network 600 of FIG. 6, the computing component 700 of FIG. 7 and the computing component 800 of FIG. 8.

Figure 6:
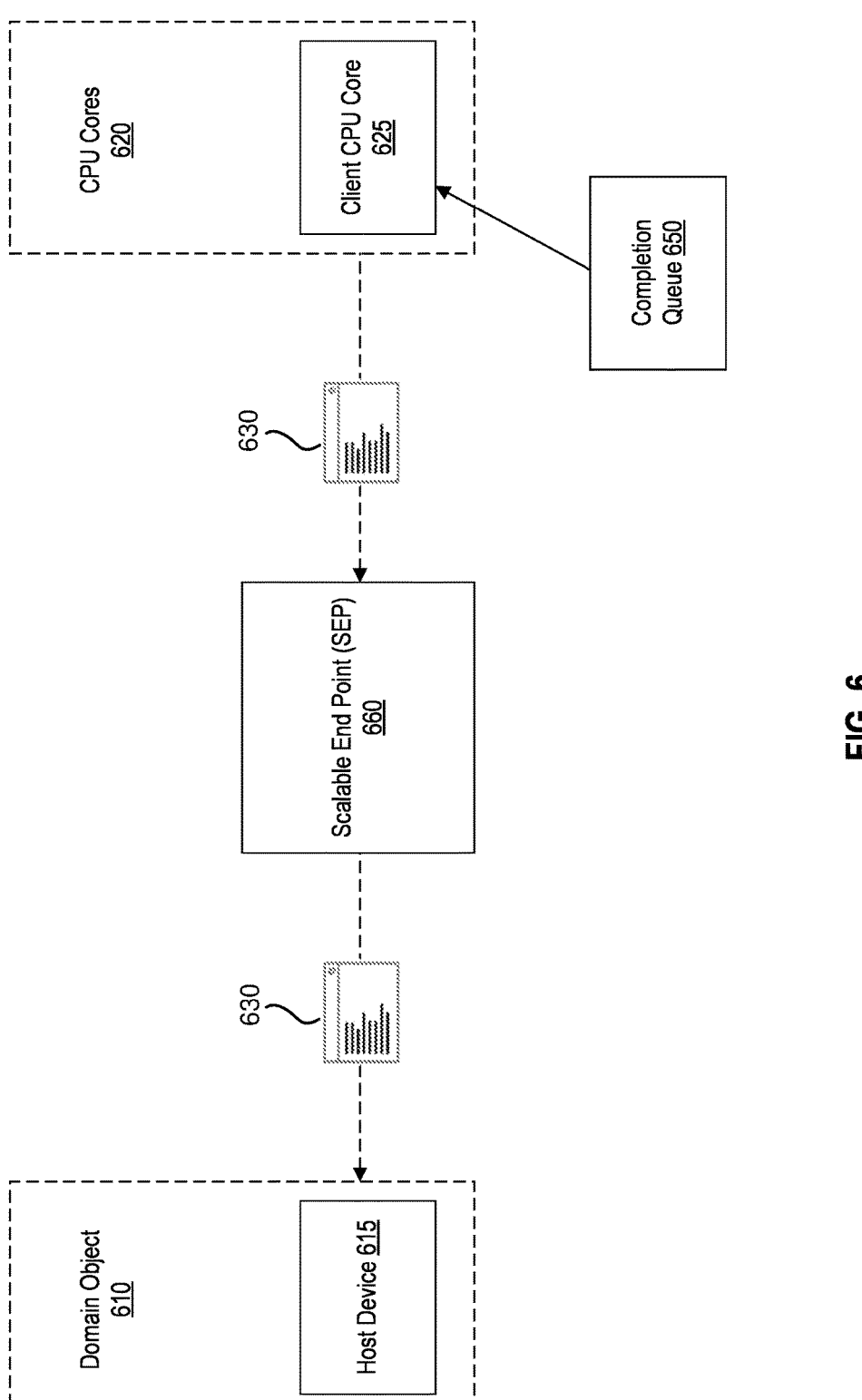
FIG. 6 is an illustration of an example network for performing a pull operation between a host device and a client CPU core using a SEP, in accordance with an example described in the present disclosure.

FIG. 6 is an illustration of an example network 600 for performing a pull operation between a host device and a client CPU core using a SEP, in accordance with an example described in the present disclosure. Upon the establishment of communication connections between a domain object, such as domain object 610, and the CPU cores of devices in a network, such as CPU cores 620 of the network 600, using a SEP, such as SEP 660, one or more operations, such as, for example, a pull operation, may be performed. The network 600, domain object 610, CPU cores 620 and SEP 660, may be implemented as, for example, network 300, domain object 310, CPU cores 320 and SEP 360 of FIG. 3 and network 500, domain object 510, CPU cores 520 and SEP 560 of FIG. 5.

A pull operation may include sending a message, such as message 630, to a host device, such as host device 615, of the domain object 610 from a client CPU core, such as client CPU core 625, of the CPU cores 620 in the network 600 using the SEP 660. The message 630 may include a write operation that may include a command to write data to the host device 615 from the client CPU core 625. The message 630 may be sent from the client CPU core 625 to the host device 615 using the SEP 660. To send the message 630 from the client CPU core 625 to the host device 615, the SEP 660 may use the transmit and receive contexts and the CPU core connection associated with the client CPU core 625. The CPU core connection for the client CPU core 625 may have an NVMe queue pair that is used to transmit data between the SEP 660 and the client CPU core 625.

The message 630 may include a unique key tag. The unique key tag may include, for example, information of where the message 630 is sent from, where the message 630 is transmitting to, the data to be collected, the data to be written, the operations to be performed, etc. The message 630 may include a client tagged buffer that may include the data requested to be written to the host device 615. A first completion event may be generated upon the completion of the message 630 being sent to the host device 615 from the client CPU core 625 using the SEP 660. The first completion event may indicate that the host device 615 received the message 630. The first completion event may indicate that the host device 615 read the message 630. The first completion event may be recorded in the completion queue 650 that is associated with the client CPU core 625.

The host device 615 may receive the message 630 and a read operation may be performed of the message 630. The host device 615 may read the message 630 to extract the data stored in the client tagged buffer in the message 630. A second completion event may be generated after the host device 615 receives the message 630 of the client tagged buffer of the data. The second completion event may indicate that the host device 615 received the data requested to be written. The second completion event may indicate that the host device 615 read the message 630 and obtained the data in the client tagged buffer. The second completion event may be recorded in the completion queue 650 that is associated with the client CPU core 625.

A write operation may be performed of the data extracted from the client tagged buffer in the message 630 to the host device 615. The extracted data may be written to the host device 615 to store the extracted data in a database of the host device 615. A third completion event may be generated after the completion of the write operation of the data to the host device 615. The third completion event may indicate that the host device 615 stored the data from the client tagged buffer of message 630 sent from client CPU core 625. The third completion event may be recorded in the completion queue 650 that is associated with the client CPU core 625.

Any number of completion events may be generated and stored in completion queue 650 to indicate the completion of one or more operations between one or more devices, such as host device 615, of domain object 610 and the client CPU core 625 of network 600. The first, second and third completion events may be consolidated into fewer completion events with each completion event indicating the completion of a plurality of operations between the domain object 610 and the target CPU core 625. The first, second and third completion events may be separated into more completion events with each completion event indicating the completion of a single operation between the domain object 610 and the client CPU core 625. Many variations are possible.

It should be appreciated that there can be additional, fewer, or alternative steps performed in similar or alternative orders, or in parallel, within the scope of the various examples discussed herein unless otherwise stated. The network 600 may be, for example, implemented as the server 110 of FIG. 1, the server 202 of FIG. 2, the server 310 of FIG. 3, the network 400 of FIG. 4, the network 500 of FIG. 5, the computing component 700 of FIG. 7 and the computing component 800 of FIG. 8.

FIG. 7 illustrates an example computing component 700 that includes one or more hardware processors 702 and machine-readable storage media 704 storing a set of machine-readable/machine-executable instructions that, when executed, cause the hardware processor(s) 702 to perform an illustrative method of generating a SEP to establish data transfer connections between a domain object consisting of a plurality of devices, such as host devices, and all of the CPU cores of devices, such as client devices, in a network. It should be appreciated that there can be additional, fewer, or alternative steps performed in similar or alternative orders, or in parallel, within the scope of the various examples discussed herein unless otherwise stated. The computing component 700 may be, for example, implemented as the server 110 of FIG. 1, the server 202 of FIG. 2, the server 310 of FIG. 3, and the computing component 800 of FIG. 8. FIG. 7 summarizes and further elaborates on some aspects previously described.

In some examples, the hardware processor(s) 702 may execute machine-readable/machine-executable instructions stored in the machine-readable storage media 704 to receive a request to establish a connection with a domain object from a network. A domain object may represent a domain that may include a plurality of devices, such as, for example, host devices, that are present within the same domain. A message may be sent from the network to a domain object. The message may include, for example, a request to establish a communication connection between the domain object and the network. The message may be sent to a host device in the domain object from a compute device in the network that wants to establish a communication connection. The message may be sent to each of the host devices in the domain object from each compute device in the network that wants to establish a communication connection with the one or more host devices in the domain object. Many variations are possible.

The network may include a plurality of computing devices, such as, for example, client devices. Each computing device in the network may have a CPU core and each CPU core may have a CPU core connection with the network. A CPU core connection may be used to as a communication connection between the respective CPU core of a compute device and another device connected to the network. Establishing a communication connection between the network and the domain object may establish communication connections between each host device of the domain object and each CPU core of each computing device in the network. Establishing a communication connection between the network and the domain object may allow messages and data to be transferred between each host device of the domain object and each CPU core of each computing device in the network. Many variations are possible.

At instruction 708, the hardware processor(s) 702 may execute machine-readable/machine-executable instructions stored in the machine-readable storage media 704 to determine a number (N) of CPU cores in the network. After receiving a message requesting to establish a connection between the domain object and the network, a number (N) of CPU cores in the network may be determined. The network may include a plurality of computing devices, such as, for example, client devices. Each computing device in the network may have a CPU core. The number (N) of computing devices in the network may be established. The number (N) of computing devices may be the same number (N) of CPU cores. Each CPU core may have a CPU core connection with the network. A CPU core connection of a device may be used to as a communication connection between the respective device and another device connected to the network via a communication connection. Each CPU core connection may include an NVMe queue pair. The NVMe queue pair may be used to transfer data between the respective CPU core of a device and another device connected to the network.

At instruction 710, the hardware processor(s) 702 may execute machine-readable/machine-executable instructions stored in the machine-readable storage media 704 to generate N set of transmit and receive contexts for the domain object. Upon determining the number (N) of computing devices, CPU cores and CPU core connections in the network, a N sets of transmit and receive contexts may be generated. The N sets of transmit and receive contexts may be communication connections for the domain object to the network. The N sets of transmit and receive contexts may be the same number of communication connections as the N of CPU core connections. Each set of N sets of transmit and receive contexts may be aligned with one of the N CPU core connections. Aligning a set of transmit and receive contexts to a CPU core connection may associate the communication connections to each other.

In some examples, the hardware processor(s) 702 may execute machine-readable/machine-executable instructions stored in the machine-readable storage media 704 to generate N completion queues for the domain object. A completion queue may be used to keep track of the completion of events or operations that occur with the domain object to the network. An event or operation may include, for example, transmitting a message or data, receiving a message or data, reading a message or data, and writing a message or data. An N amount of completion queues may be generated for the domain object. Each completion queue for the domain object may be associated to a different set of the N sets of transmit and receive contexts. Each completion queue for the domain object may further be associated to a CPU core connection that is aligned to the respective set of transmit and receive contexts. In this way, each completion queue will track the events or operations that are performed between the domain object and the respective CPU core of the respective device in the network. This may allow the recording and separation of records of events or operations occurring between host devices of the domain object and of each CPU core of each device in the network.

In some examples, the hardware processor(s) 702 may execute machine-readable/machine-executable instructions stored in the machine-readable storage media 704 to generate an address vector for the domain object for storing remote addresses for connectionless fabrics. An address vector may store remote addresses of devices in the network, including, for example, the remote addresses of all of the CPU cores of the devices in the network, the remote address of the domain object, and the remote addresses of all of the host devices of the domain object. The address vector may reduce the memory requirements needed to store remote addressing data. The address vector for the domain object may be generated to use to generate a SEP.

At instruction 712, the hardware processor(s) 702 may execute machine-readable/machine-executable instructions stored in the machine-readable storage media 704 to generate a SEP for the domain object using the address vector. The address vector for the domain object may be used to generate a SEP. A SEP may closely resemble the "multi-queue" concept in networking and may improve the performance of multi-threaded and parallel applications, by allowing threads to access independent transmit and receive context queues. A SEP may have the additional benefit of allowing the creation of multiple transmit and receive contexts whose addresses can be computed to use a single, base address. The single, base address of the SEP may be the address vector. A SEP can improve the amount of memory required to establish data transfer connections between a plurality of host devices in a domain object and a network consisting of a plurality of CPU cores of computing devices. A SEP can also reduce the overhead processing requirements that are associated with the memory registration in a Remote Direct Memory Access (RDMA) operation. The SEP may use the address vector to establish connectionless fabrics of communications between host devices of the domain object and the CPU cores of devices in the network. The SEP may also include a network address and specified port of the domain object.

At instruction 714, the hardware processor(s) 702 may execute machine-readable/machine-executable instructions stored in the machine-readable storage media 704 to establish the connection between the network and the domain object using the SEP. The SEP may be used to establish the communication connections between all of the CPU cores of devices in the network and all of the host devices of the domain object. The communication connections established by the use of the SEP may be connectionless fabrics of communications. The communication connections established by the use of the SEP may be created by mapping the N sets of transmit and receive contexts of the domain object to the NVMe queue pairs of the N CPU core connections. In this way, a message or data that is transmitted between a CPU core of a device of the network to a host device of the domain object may use a particular set of transmit and receive contexts communication connection that is associated with the CPU core connection of the respective CPU core of the respective device of the network.

At instruction 716, the hardware processor(s) 702 may execute machine-readable/machine-executable instructions stored in the machine-readable storage media 704 to transfer data through the network using the mapping between the transfer and receive contexts to the NVMe queue pairs and the domain object using the SEP. For example, by performing the mapping, communication connections may be established. Establishing the communication connections using the SEP may allow the transmittance of messages and data between the host devices of the domain object and the CPU cores of the devices in the network. Each of the communication connections established from using the SEP may represent a 1-to-1 mapping between the domain object and one CPU core of a device in the network. Each host device of the domain object may use the same communication connection to transmit and receive messages and data to the respective CPU core of the device in the network that the communication connection is associated with. In this way, using the SEP may only use a small and constant amount of memory for all of the queues of all of the connections between the domain object and all of the CPU cores of the devices in the network. A single client device of the domain object may have communication connections with each CPU core of each device in the network without using large amounts of memory and negatively affecting the processing performance of the communications, such as, for example, data transfers, performed.

Once communication connections are established between the domain object and all of the CPU cores of the devices in the network using the SEP, messages and data may be sent and received between host devices of the domain object and the CPU cores of the devices in the network. In some examples, an event queue for the domain object may be generated. The event queue may be used to track data transfers that are flowing through the domain object. Data transfers flowing through the domain object may include any data transfers that are flowing from or to any of the host devices in the domain object. In this way, the event queue may be used to track all data transfers that are occurring with the domain object to the network.

Upon the establishment of communication connections between the domain object and CPU cores of devices in the network using the SEP, one or more operations, such as, for example, a push operation and a pull operation, may be performed. A push operation may include sending a message to a host device of the domain object from a client CPU core of a client device in the network using the SEP. The message may include a command to read data from the host device. The message may be sent to the host device from the client CPU core using the SEP. The message may include a unique key tag. The unique key tag may include, for example, information of where the message is sent from, there the message is transferring to, the data to be collected, etc. The host device of the domain object may receive the message and a write operation may be performed of the data being requested from the host device of the domain object. The data of the host device may be written into a client tagged buffer for the client CPU core to read the data of the host device. A first completion event may be generated after the completion of the write operation of the data of the host device. The first completion event may indicate that the host device received the message and provided the data being requested. The first completion event may be recorded in the N completion queue that is associated with the client CPU core. The client tagged buffer with the data of the host device may be sent from the host device to the client CPU core using the SEP. A second completion event may be generated after the client CPU core receives the client tagged buffer of the data of the host device. The second completion event may indicate that the client CPU core received the data of the host device that was requested. The second completion event may indicate that the client CPU core read the data of the host device that was requested. The second completion event may be recorded in the N completion queue that is associated with the client CPU core.

A pull operation may include sending a message from a client CPU core in the network to a host device of a domain object using the SEP. The message may include a command to write data to the host device of a domain object. The message may be sent from the client CPU core to the host device using the SEP. The message may include a unique key tag. The unique key tag may include, for example, information of where the message is sent from, there the message is transferring to, the data to be collected, etc. The message may include a client tagged buffer that may include the data requested to be written to the host device. A first completion event may be generated upon the completion of the message being sent from the client CPU core to the host device using the SEP. The first completion event may indicate that the host device received the message. The first completion event may indicate that the host device read the message. The first completion event may be recorded in the N completion queue that is associated with the client CPU core. The host device may receive the message and a read operation may be performed on the client tagged buffer in the message. Performing a read operation on the client tagged buffer may extract the data requested to be written to the host device. After the read operation is completed, a write operation may be performed. The write operation may include writing the data from the client tagged buffer of the client CPU core to the host device. A second completion event may be generated after the host device receives the client tagged buffer of the data. The second completion event may indicate that the host device received the data requested to be written. The second completion event may indicate that the host device read the data. A third completion event may be generated after the completion of the write operation of the data to the host device. The third completion event may indicate that the host device stored the data from the client tagged buffer. The second and third completion events may be recorded in the N completion queue that is associated with the client CPU core. The first, second and third completion events may be consolidated into fewer completion events with each completion event indicating the completion of a plurality of operations between the domain object and the client CPU core. The first, second and third completion events may be separated into more completion events with each completion event indicating the completion of a single operation between the domain object and the client CPU core. Many variations are possible.

Using the SEP may improve the amount of memory required to establish the data transfer connections between host devices in the same domain object and all of the CPU cores in the network. With the SEP having a single transport level address (i.e., address vector), the memory requirements needed to store remote addressing data may be reduced in comparison with traditional systems. The SEP may establish data transfer connections between each of a plurality of host devices in the domain object and all of the CPU cores of devices in the network with only a small and constant amount of memory being used for all of the queues of all of the connections to all of the CPU cores in the network. In this way, a small and constant amount of memory may be used to establish data transfer connections between a domain object and CPU cores, regardless of the number of CPU cores of devices in the network. By also using the SEP to align NVMe queue pairs of CPU cores with respective transmit/receive contexts and completion queues of the domain object, the SEP may create 1-to-1 mapping between the domain object and each of the CPU cores of devices in a network.

The foregoing description provides specific details for a comprehensive understanding of, and enabling description for, various examples of the technology. It is intended that the terminology used be interpreted in its broadest reasonable manner, even where it is being used in conjunction with a detailed description of certain examples of the disclosure.

It is to be understood that the foregoing disclosure is not limited to specific compositions or process steps, and as such, may vary. As used herein, the singular forms "a," "an," and "the" are intended to include the plural forms as well, unless the context clearly indicates otherwise. Furthermore, to the extent that the terms "including," "includes," "having," "has," "with," "such as," or variants thereof, are used in either the specification and/or the claims, such terms are not limiting and are intended to be inclusive in a manner similar to the term "comprising." Unless specifically noted, examples in the specification that recite "comprising" various components are also contemplated as "consisting of" or "consisting essentially of" the recited components.

FIG. 8 illustrates a block diagram of an example computer system 800 in which various examples of the present disclosure may be implemented. The computer system 800 may be implemented as the server 110 of FIG. 1, the server 202 of FIG. 2, the server 310 of FIG. 3, and the computing component 700 of FIG. 7. The computer system 800 can include a bus 802 or other communication mechanism for communicating information, one or more hardware processors 804 coupled with the bus 802 for processing information. The hardware processor(s) 804 may be, for example, one or more general purpose microprocessors. The computer system 800 may be an example of a SEP, client-target communication or similar device. The computer system 800 may use the bus 802 and the hardware processor(s) 804 to perform operations or transfer instructions. For example, processor 804 may transmit a request via bus 802 to access instructions stored in memory 806 or ROM 808 to receive a message from a host device, read the message from the host device, generate a message for client device, or transmit the message for client device. In another example, processor 804 may transmit a request via bus 802 to access instructions stored in memory 806 or ROM 808 to generate a SEP, determine communication links for client devices in a network, generate communication links for a host device in the network, or use the SEP to establish communication connections between the host device and the client devices in the network. Various operations may be transmitted via bus 802 without diverting from the essence of the disclosure.

The computer system 800 can also include a main memory 806, such as a random access memory (RAM), cache and/or other dynamic storage devices, coupled to the bus 802 for storing information and instructions to be executed by the hardware processor(s) 804. The main memory 806 may also be used for storing temporary variables or other intermediate information during execution of instructions by the hardware processor(s) 804. Such instructions, when stored in a storage media accessible to the hardware processor(s) 804, render the computer system 800 into a special-purpose machine that can be customized to perform the operations specified in the instructions. The instructions may comprise, for example, generate a SEP, determine communication links for client devices in a network, generate communication links for a host device in the network, or use the SEP to establish communication connections between the host device and the client devices in the network.

The computer system 800 can further include a read only memory (ROM) 808 or other static storage device coupled to the bus 802 for storing static information and instructions for the hardware processor(s) 804. A storage device 810, such as a magnetic disk, optical disk, or USB thumb drive (Flash drive), etc., can be provided and coupled to the bus 802 for storing information and instructions. The ROM 808 and storage device 810 may store information, such as, for example, identity information of the host device, client devices, address vector, SEP, etc. The ROM 808 and storage device 810 may store information and instructions to perform operations. The operations may comprise, for example, generate a SEP, determine communication links for client devices in a network, generate communication links for a host device in the network, or use the SEP to establish communication connections between the host device and the client devices in the network.

Computer system 800 can further include at least one network interface 812, such as a network interface controller module (NIC), network adapter, or the like, or a combination thereof, coupled to the bus 802 for connecting the computer system 800 to at least one network. The network interface 812 can provide a two-way data communication coupling to one or more network links that are connected to one or more local networks. For example, network interface 812 may be an integrated services digital network (ISDN) card, cable modem, satellite modem, or a modem to provide a data communication connection to a corresponding type of telephone line. As another example, network interface 812 may be a local area network (LAN) card to provide a data communication connection to a compatible LAN (or WAN component to communicated with a WAN). Wireless links may also be implemented. In any such implementation, network interface 812 may send and receive electrical, electromagnetic or optical signals that carry digital data streams representing various types of information.

A network link typically can provide data communication through one or more networks to other data devices. For example, a network link may provide a connection through local network to a host computer or to data equipment operated by an Internet Service Provider (ISP). The ISP in turn can provide data communication services through the world wide packet data communication network now commonly referred to as the "Internet." Local network and Internet both use electrical, electromagnetic or optical signals that can carry digital data streams. The signals through the various networks and the signals on network link and through network interface 812, which can carry the digital data to and from computer system 800, are example forms of transmission media.

The computer system 800 can send messages and receive data, including program code, through the network(s), network link and network interface 812. In the Internet example, a server might transmit a requested code for an application program through the Internet, the ISP, the local network and the network interface 812. The received code may be executed by processor 804 as it is received, and/or stored in storage device 810, or other non-volatile storage for later execution. The network interface 812 may be used to transmit and receive data communication between a host device and one or more client devices using a SEP. Various communications are illustrated throughout the disclosure, such as, for example, the data communication of the push operation of FIG. 5 and the data communication of the pull operation of FIG. 6.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computer system 800, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques or technology described herein using customized hard-wired logic, one or more ASICs or FPGAS, firmware and/or program logic which in combination with the computer system 800 that causes or programs the computer system 800 to be a special-purpose machine. According to one or more examples, the techniques described herein are performed by the computer system 800 in response to the hardware processor(s) 804 executing one or more sequences of one or more instructions contained in the main memory 806. Such instructions may be read into the main memory 806 from another storage medium, such as the storage device 810. Execution of the sequences of instructions contained in the main memory 806 can cause the hardware processor(s) 804 to perform process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 810. The volatile media can include dynamic memory, such as the main memory 806. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The non-transitory media is distinct from but may be used in conjunction with transmission media. The transmission media can participate in transferring information between the non-transitory media. For example, the transmission media can include coaxial cables, copper wire and fiber optics, including the wires that comprise the bus 802. The transmission media can also take a form of acoustic or light waves, such as those generated during radio-wave and infra-red data communications.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:

determining a set of non-volatile memory express (NVMe) queue pairs of central processing unit (CPU) core connections of CPU cores in a network;

generating a set of transmit and receive contexts for a domain object that are aligned with the set of NVMe queue pairs of CPU core connections of CPU cores;

generating a scalable end point (SEP) for the domain object using an address vector for the domain object, and wherein the address vector for the domain object stores remote addresses for the CPU cores in the network and the domain object;

mapping, using the SEP, the set of transmit and receive contexts to the set of NVMe queue pairs of the CPU core connections to the domain object;

using the mapping between the set of transmit and receive contexts to the set of NVMe queue pairs of the CPU core connections and the domain object, transferring data through the network; and

performing an operation between a host device of the domain object and a client CPU core using the SEP, wherein the operation comprises:

generating a first completion event for a first completion queue associated with the client CPU core based on sending a request message, from the client CPU core to the host device, with a unique key tag using the SEP; and generating a second completion event for the first completion queue after completion of the operation.

2. The method of claim 1, wherein the address vector for the domain object stores remote addresses for connectionless fabrics.

3. The method of claim 1, further comprising:

generating a completion queue for the domain object that stores events or operations that have been completed between the domain object and the network.

4. The method of claim 1, further comprising:

prior to generating the SEP for the domain object and within a time threshold, receiving a request to establish a connection with the domain object.

5. The method of claim 1, further comprising:

generating an event queue for the domain object that stores data transfers received by the domain object.

6. The method of claim 1, wherein characteristics of the SEP comprise a network address and specified port of the domain object.

7. The method of claim 1, further comprising:

generating a set of completion queues for the domain object, wherein the set of completion queues are associated to the set of transmit and receive contexts.

8. The method of claim 1, wherein the operation comprises a push operation between the host device of the domain object and the client CPU core using the SEP.

9. The method of claim 8, wherein the request message is a read request message, wherein the data comprises host device data, and wherein the push operation comprises:

sending, from the client CPU core to the host device, the read request message with the unique key tag using the SEP;

performing, at the host device, a write operation of the host device data into a client tagged buffer based on the read request message;

generating the first completion event for the first completion queue associated with the client CPU core after completion of the write operation;

sending, from the host device to the client CPU core, the client tagged buffer using the SEP; and generating the second completion event for the first completion queue after the client CPU core receives the client tagged buffer.

10. The method of claim 1, wherein the operation comprises a pull operation between the host device of the domain object and the client CPU core using the SEP.

11. The method of claim 10, wherein the request message is a write request message, wherein the data comprises client data, and wherein the pull operation comprises:

sending, from the client CPU core to the host device, the write request message with the unique key tag and a client tagged buffer of the client data using the SEP;

generating the first completion event for the first completion queue associated with the client CPU core based on the write request message;

performing, at the host device, a read operation of the client data from the client tagged buffer;

performing, at the host device, a write operation of the client data to the host device based on the write request message; and generating the second completion event for the first completion queue after completion of the write operation.

12. A computing system comprising:

a first domain object of a plurality of domain objects;

a network comprising a plurality of central processing unit (CPU) cores;

one or more processors; and memory coupled to the one or more processors to store instructions that, when executed by the one or more processors, cause the one or more processors to perform operations, the operations comprising:

determine a set of non-volatile memory express (NVMe) queue pairs of CPU core connections of CPU cores in the network;

generate a set of transmit and receive contexts for the first domain object aligned with the CPU core connections;

generate a scalable end point (SEP) for the first domain object using an address vector for the domain object, and wherein the address vector for the domain object stores remote addresses for the CPU cores in the network and the domain object;

map, using the SEP, the set of transmit and receive contexts to the set of NVMe queue pairs of the CPU core connections to the domain object;

using the mapping between the set of transmit and receive contexts to the set of NVMe queue pairs of the CPU core connections and the domain object, transfer data through the network; and perform an operation between a host device of the domain object and a client CPU core using the SEP, wherein the operation comprises:

generating a first completion event for a first completion queue associated with the client CPU core based on sending a request message, from the client CPU core to the host device, with a unique key tag using the SEP; and generating a second completion event for the first completion queue after completion of the operation.

13. The computing system of claim 12, wherein the operation comprises a push operation between the client CPU core and the host device of the first domain object using the SEP.

14. The computing system of claim 13, wherein request message is a read request message, wherein the data comprises host device data, and wherein the push operation comprises:

send, from the client CPU core to the host device, a read request message with the unique key tag using the SEP;

generate the first completion event for the first completion queue associated with the client CPU core after completion of a write operation of the host device data into a client tagged buffer based on the read request message;

send, from the host device to the client CPU core, the client tagged buffer using the SEP; and generate the second completion event for the first completion queue after the client CPU core receives the client tagged buffer.

15. The computing system of claim 12, wherein the wherein the operation comprises a pull operation between the host device of the first domain object and the client CPU core using the SEP.

16. The computing system of claim 15, wherein the request message is a write request message, wherein the data comprises client data, and wherein the pull operation comprises:

send, from the client CPU core to the host device, the write request message with the unique key tag and a client tagged buffer of client data using the SEP;

generate the first completion event for the first completion queue associated with the client CPU core based on the write request message; and generate the second completion event for the first completion queue after completion of a write operation of the client data to the host device based on the write request message.

17. A non-transitory storage medium storing instructions that, when executed by at least one processor, cause the at least one processor to perform operations comprising:

determine a set of non-volatile memory express (NVMe) queue pairs of central processing unit (CPU) core connections of CPU cores in a network;

generate a set of transmit and receive contexts for a domain object that are aligned with the set of NVMe queue pairs of CPU core connections of CPU cores;

generate a scalable end point (SEP) for the domain object using an address vector for the domain object, and wherein the address vector for the domain object stores remote addresses for the CPU cores in the network and the domain object;

map, using the SEP, the set of transmit and receive contexts to the set of NVMe queue pairs of the set of CPU core connections to the domain object;

using the mapping between the set of transmit and receive contexts to the set of NVMe queue pairs of the set of CPU core connections and the domain object, transfer data through the network; and perform an operation between a host device of the domain object and a client CPU core using the SEP, wherein the operation comprises:

generating a first completion event for a first completion queue associated with the client CPU core based on sending a request message, from the client CPU core to the host device, with a unique key tag using the SEP; and generating a second completion event for the first completion queue after completion of the operation.

18. The non-transitory storage medium of claim 17, wherein the instructions further cause the at least one processor to perform the operations comprising:

generate a set of completion queues for the domain object, wherein the set of completion queues are associated to the set of transmit and receive contexts.

19. The non-transitory storage medium of claim 17, wherein the operation comprises a push operation between the host device the domain object and the client CPU core using the SEP, wherein the request message is a read request message, wherein the data comprises host device data, and wherein the push operation comprises:

sending, from the client CPU core to the host device, the read request message with the unique key tag using the SEP;

generating the first completion event for the first completion queue associated with the client CPU core after completion of a write operation of the host device data into a client tagged buffer based on the read request message;

sending, from the host device to the client CPU core, the client tagged buffer using the SEP; and generating the second completion event for the first completion queue after the client CPU core receives the client tagged buffer.

20. The non-transitory storage medium of claim 17, wherein the operation comprises a pull operation between the host device of the domain object and the client CPU core using the SEP, wherein the request message is a write request message, wherein the data comprises client data, and wherein the pull operation comprises:

sending, from the client CPU core to the host device of the domain object, the write request message with the unique key tag and a client tagged buffer of the client data using the SEP;

generating the first completion event for the first completion queue associated with the client CPU core based on the write request message; and generating the second completion event for the first completion queue after completion of a write operation of the client data to the host device based on the write request message.

\* \* \* \* \*